(No Model.) 5 Sheets—Sheet 1.

L. G. THOMPSON & A. H. ISHAM.
COMBINED BALING PRESS AND FEEDER.

No. 363,095. Patented May 17, 1887.

(No Model.) 5 Sheets—Sheet 2.

L. G. THOMPSON & A. H. ISHAM.
COMBINED BALING PRESS AND FEEDER.

No. 363,095. Patented May 17, 1887.

Witnesses,
Geo. H. Strong.
J. H. Towne.

Inventors,
L. G. Thompson
A. H. Isham
By Dewey & Co.
atty (No Model.) 5 Sheets—Sheet 3.
L. G. THOMPSON & A. H. ISHAM.
COMBINED BALING PRESS AND FEEDER.
No. 363,095. Patented May 17, 1887.
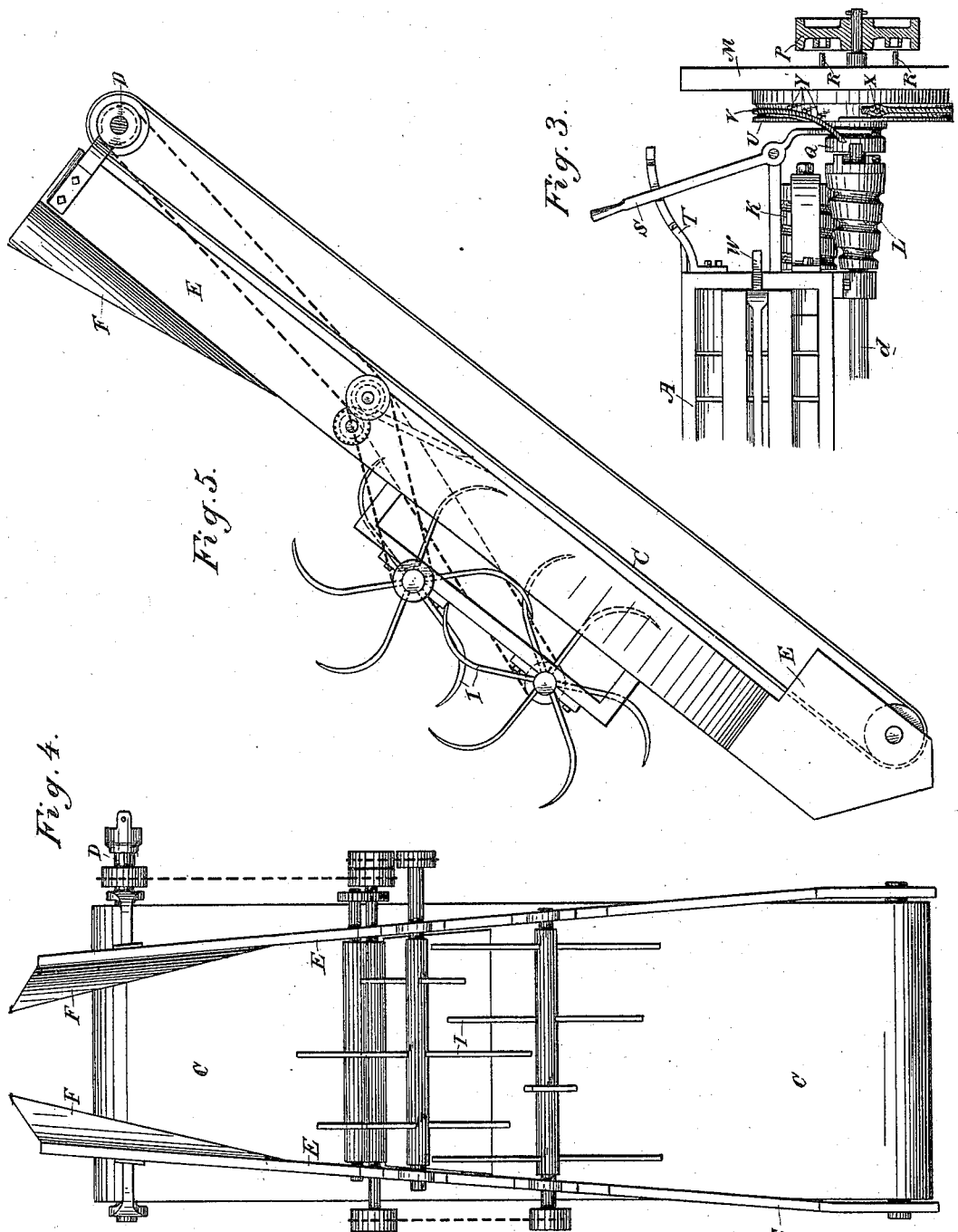

(No Model.) 5 Sheets—Sheet 4.

L. G. THOMPSON & A. H. ISHAM.
COMBINED BALING PRESS AND FEEDER.

No. 363,095. Patented May 17, 1887.

(No Model.) 5 Sheets—Sheet 5.
L. G. THOMPSON & A. H. ISHAM.
COMBINED BALING PRESS AND FEEDER.
No. 363,095. Patented May 17, 1887.
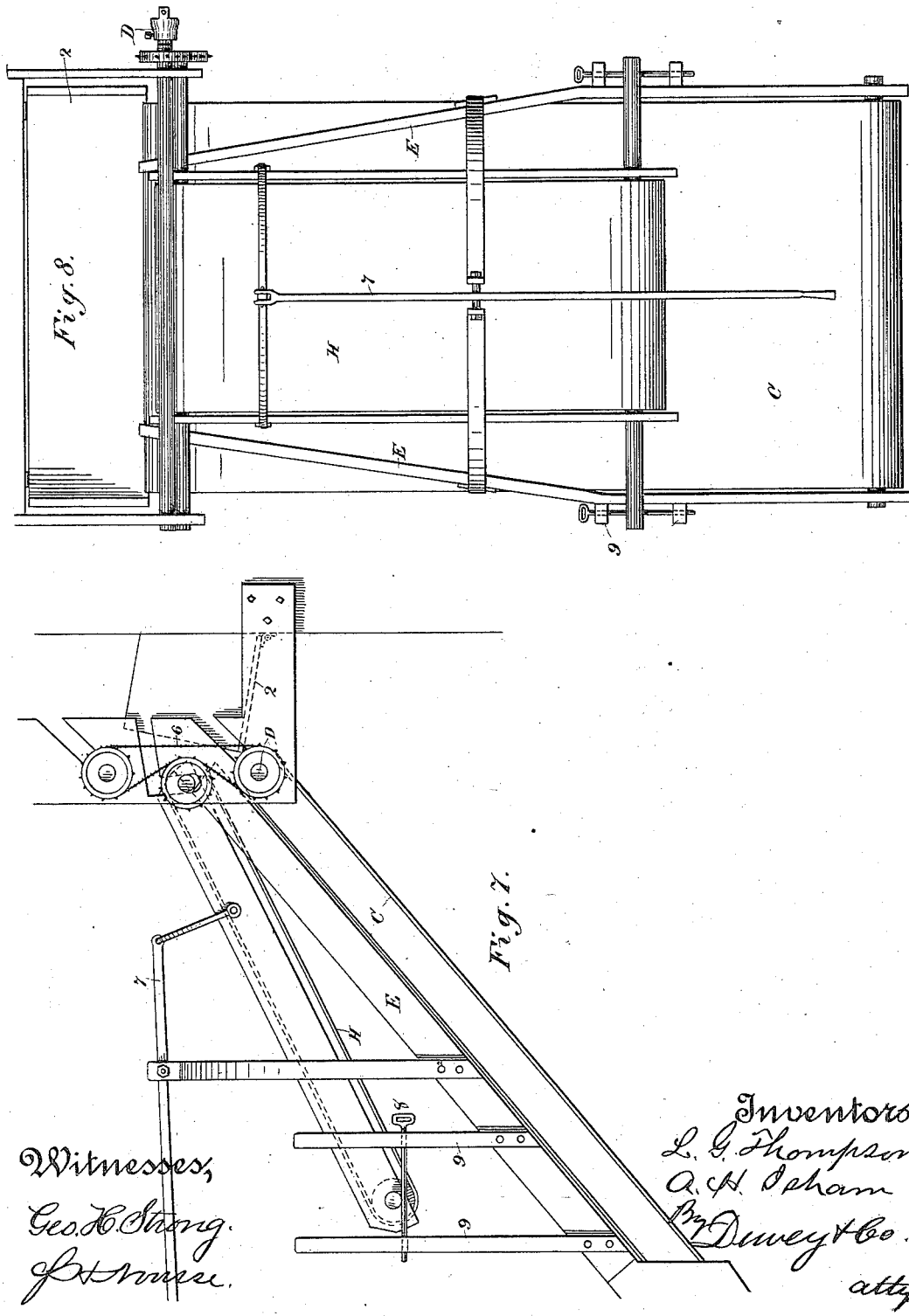

UNITED STATES PATENT OFFICE.

LYMAN G. THOMPSON AND ALFRED H. ISHAM, OF SAN FRANCISCO, CALIFORNIA, ASSIGNORS TO TRUMAN ISHAM & HOOKER, OF SAME PLACE.

COMBINED BALING-PRESS AND FEEDER.

SPECIFICATION forming part of Letters Patent No. 363,095, dated May 17, 1887.

Application filed January 21, 1887. Serial No. 225,011. (No model.)

*To all whom it may concern:*

Be it known that we, LYMAN G. THOMPSON and ALFRED H. ISHAM, of the city and county of San Francisco, State of California, have invented an Improvement in a Combined Baling-Press and Feeder; and we hereby declare the following to be a full, clear, and exact description of the same.

Our invention relates to certain improvements in baling-presses; and it consists in a novel means of delivering the hay or material to be baled in regular or irregular quantities into the press and partially compressing it before delivering to the press, an improved mechanism for pressing the same in successive charges, and a means for loosening and discharging the bale after it has been finished, together with certain details of construction, all of which will be more fully explained by reference to the accompanying drawings, in which—

Figure 1:
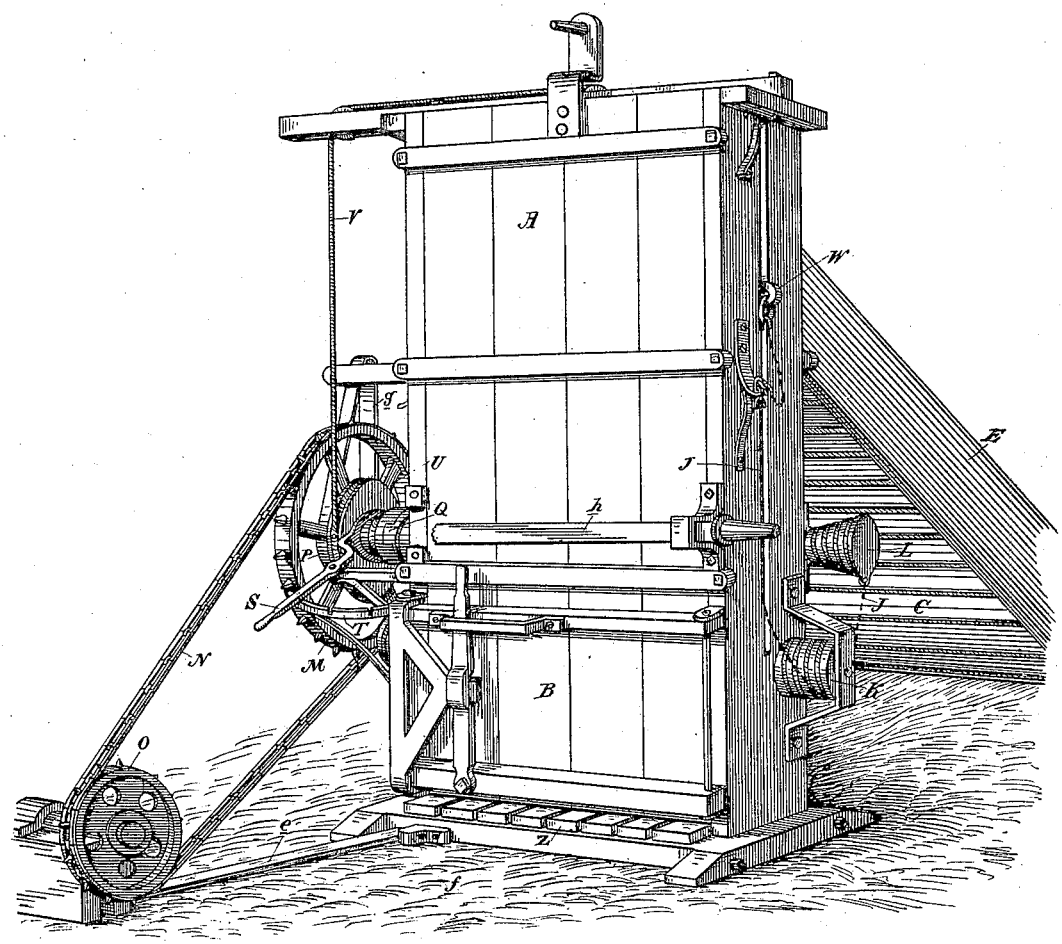
Figure 2:
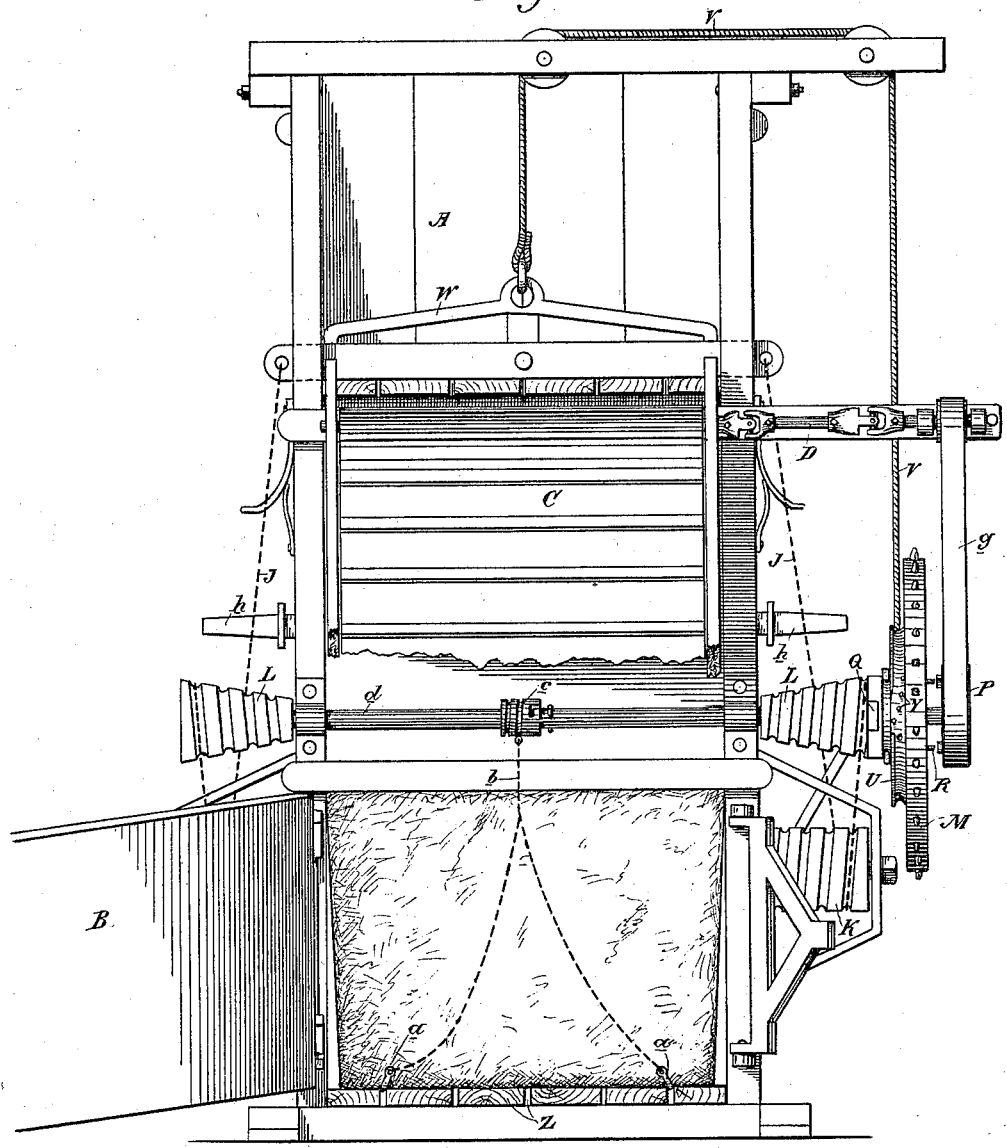
Figure 6:
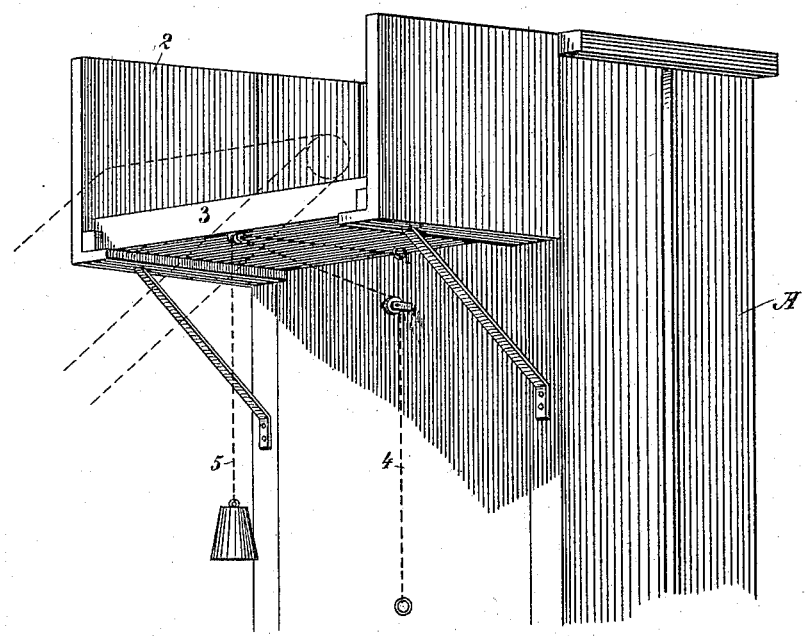

Figure 1 is a perspective view of the exterior of the press, showing the driving pulleys and chains from the rear. Fig. 2 is a longitudinal vertical section. Fig. 3 is a detail view showing the clutch mechanism and lever for engaging and disengaging the same. Fig. 4 is a plan, and Fig. 5 is a side elevation, of the compressing feeder. Fig. 6 is a view of the receiving-box between the feeder and the press. Figs. 7 and 8 are a side elevation and plan of a modification of the feeder.

Our invention is shown as applicable to a vertical press, in which A is the body or case, having an opening at the top, into which the hay is fed, and doors B, at the bottom, through which the finished bale may be discharged.

Hay is usually baled from a stack, and in order to deliver the hay into the press we employ a traveling draper or carrier, C. This carrier passes over a drum at the upper end, supported upon the upper part of the press, and another drum or roller at the lower end. Power is applied to operate it through a shaft, D, by means of a belt, tumbling-rod, or other suitable appliance.

Above the belt C is fixed a frame or side walls, E, which are wider apart at the lower end and contracted at the upper or delivery end, where they have also curved overarching side pieces, F, so that the hay, which is placed upon the lower end of the belt, will be gradually compressed between the side walls as it passes upward, and also turned inward by means of the overarching parts F. In connection with this device we also use a second belt, H, which passes around rollers or drums above the upper end of the main belt, and the hay is carried between these two belts and is compressed between the upper rollers, so that it is delivered in a comparatively condensed form into the press.

In Figs. 7 and 8 we have shown the upper rollers of the two belts C and H placed near enough together to compress the hay as it arrives at that point, and it is delivered from these rollers either directly into the press, or it may be first received in a box, 2, hinged or otherwise attached to the side of the press, and having a sliding bottom, 3. This bottom with its load may be drawn inward, so as to discharge it into the press, by means of a cord, 4, and the weight 5 acts to return it as soon as the cord is released.

The rollers or drums at the upper end, around which the two belts C and H pass, are drawn by the chain 6 engaging sprocket-wheels upon the outer ends of the drum-shafts. The drum-shaft of the upper belt is journaled in vertical slots, which allow it to move away from the lower roller when any masses of unusual thickness arrive, and a lever, 7, is fulcrumed above the upper belt-frame and connected with it, so that by the aid of the lever the belt and its roller may be raised or depressed by the operator. The lower end of this belt-frame is also made adjustable in height by means of movable pins 8, which pass through vertical standards 9.

In Figs. 4 and 5 the compression-rollers are journaled above the main belt and below the curved edges or flanges F, their action being the same as above described when they are close to the discharge.

In order to regulate the feed we employ pickers I, which project from horizontal shafts extending across above the carrying-belt C, and these shafts are caused to rotate, so as to turn the picking-fingers against the upwardly-moving hay, so that any bunches of hay may be pressed backward and more evenly distributed.

When the hay has been delivered into the press until it is full, the follower being raised up to the top for the purpose, the follower will be released and power applied to force it down by means of chains J, connected with its ends and passing around the conical rollers K, which direct it to the rollers L, to which the power is applied. Upon these latter rollers the chain is wound up until this charge of hay has been pressed into the bottom of the press, when the follower is again raised up above the feed-opening and another charge of hay delivered into the press.

In order to drive the feed-belt and allow the pressing mechanism to remain stationary, or to change the operation so as to drive the pressing mechanism and allow the feed-belt to remain stationary, we employ a clutch mechanism of any convenient or well-known form. In the present case it consists of a chain-pulley, M, around which the driving-chain N passes from the pulley O, to which power is applied in any suitable manner.

The pulley M turns loosely upon the shaft of the chain-drum L, and upon the outer end of this shaft is another pulley, P, through which power is applied to drive the shaft D of the feed-belt C. Upon the inner end of the hub of the chain-pulley M are clutches Q, which engage with similar clutches upon the chain-drum M, and upon the outer side of the wheel M are pins R, which will engage with the wheel P when the chain-wheel M is moved to that side.

S is a clutch-lever by which the chain-wheel may be shifted upon the shaft of the chain-drum L, so as to either engage the pulley P and, through the belt g and shaft D, drive the feed mechanism, or be moved to the opposite side, so as to engage the chain-drum L and drive the pressing mechanism, it being thrown out of gear with the feed mechanism when it is operating the pressing mechanism and thrown out of gear with the pressing mechanism when it is operating the feed mechanism.

T is a rack, having notches in which the clutch-lever S is held in either of the engagements; or it may be held centrally, so as not to operate either of them.

Upon the inner side of the chain-pulley M is a sheave, U, around which the cable V passes. This cable is connected with a bail, W, which is attached to the follower, and through which the follower is raised after having been forced down. In order to raise this follower, the chain-pulley M with the sheave U are set in the middle between the drum L and the pulley P, and the pin X, which passes through the end of the cable, is inserted in a hole in the rim of the sheave U. The rotation of the chain-pulley then winds the cable V upon the sheave until it has made one turn. The rim of the sheave is cut away, and a row of pins, Y, are placed in the channel or groove of the sheave, so that when the revolution has been completed the follower is raised to the top and the cable V will be thrown off the sheave and will cease to raise the follower, and the end of the cable may then be removed from the sheave again to allow the other work to proceed. The wires or cords for binding or tying the bale are placed in channels made in the bottom or floor Z of the press, in the usual manner, and when the bale has been compressed they are passed through similar grooves or channels made transversely in the follower. The bale is tied or secured in the customary manner. After this has been completed the doors B upon the opposite sides of the press are opened and the bale is tilted or loosened, so as to be readily thrown out by means of hooks a, which are connected by a rope or chain, b, with the winding-drum c upon the shaft d. Power is applied to this shaft so as to wind the chain up and by means of the hooks a loosen the bale within the press and tilt it so that it will easily roll out, the press being made slightly narrower at the side nearest the chain and hooks than it is at the opposite side, as before described. Power to drive the chain-pulley M is applied through the pulley O, the shaft of which may be driven by an ordinary horse or other power, and in setting the press this horse-power frame is set in the proper position to allow the chain N to pass around the pulleys M and O and to give it the proper tension.

The relative position of the horse-power frame and the press is maintained by means of a brace, e, which fits in a socket, f, formed upon the foot of the press at one end, and another upon the end of the horse-power at the opposite end, and this maintains the two in the proper relative position. By this construction the press is easily set up at any desired point, and the power is readily applied to operate it within a comparatively small space, and the mechanism for driving the different parts is easily handled and the work is very expeditious.

Across one side of the press is secured an axle, h, upon the ends of which bearing-wheels are fitted, so that when the press is to be moved about it is turned down so as to be supported flatwise upon the wheels, and it can then be hauled like a wagon.

Having thus described our invention, what we claim as new, and desire to secure by Letters Patent, is—

1. In a baling-press, the downwardly-moving follower, operating-chains, and chain-drum L, in combination with the chain-pulley turning loosely upon the drum-shaft, the clutch mechanism, and lever by which it is thrown into and out of engagement with the same, substantially as herein described.

2. In a baling-press, the downwardly-moving follower within the case to compress the bale, the operating chain-drums, and loosely-mounted chain-pulley and its clutch mechanism, in combination with the cable-sheave, the cable extending over direction-pulleys connecting with a bail upon the follower, whereby the same is elevated, substantially as herein described.

3. The chain-pulley-operating shaft having a drum fixed to its center, in combination with the ropes or chains passing around said drum, and the hooks $a$, by which the bale is displaced after it is tied, substantially as herein described.

4. A baling-press having a downwardly-moving follower and a mechanism by which the follower is moved within the press, in combination with a traveling feed-belt by which the material is delivered into the press, a loosely-mounted main driving-pulley, and driving-shaft and belt-pulleys through which power may be applied from the main driving-pulley to actuate the feed-belt or draper, substantially as herein described.

5. The drum or pulley mounted on a horizontal shaft, and connected mechanism through which the follower is moved downward to compress the bale, and a pulley on the outer end of said shaft, from which power is applied to drive the draper or feed-belt, in combination with the intermediately-placed chain-pulley M, through which power is applied to the clutch mechanisms, and the lever whereby the pulley M may be thrown into contact with the chain-winding drum or into contact with the driving-pulley, or maintained independently of either, substantially as herein described.

6. The chain-driving pulley mounted upon the shaft of the chain-winding drum, for compressing, and the pulley for driving the feed-belt, in combination with the cable-sheave attached to said chain-pulley, and a cable extending from said sheave over direction-pulleys and connected with a bail upon the follower, whereby the latter may be raised after being forced down, substantially as herein described.

7. A baling-press having a downwardly-moving follower and operating mechanism, in combination with an inclined feeding-chute and traveling belt, and a second inclined belt above and contiguous to the first belt, whereby a preliminary compression is given the material, substantially as herein described.

8. A baling-press comprising a downwardly-moving follower, an inclined feed-belt or draper, a second inclined belt or draper above and contiguous to the feed-belt, in which a preliminary compression is given the material, and a frame or side walls contracted at their upper or delivery ends, substantially as herein described.

9. A baling-press comprising a case and a follower moving downwardly within said case, in combination with an inclined feed-belt or draper, a second inclined belt above and contiguous to the feed-belt, a vertically-moving roller or drum at the discharge end of said belts, and a controlling-lever, substantially as herein described.

In witness whereof we have hereunto set our hands.

LYMAN G. THOMPSON.
ALFRED H. ISHAM.

Witnesses:
S. H. NOURSE,
H. C. LEE.